United States Patent

Eguchi

[11] Patent Number: 5,926,001
[45] Date of Patent: Jul. 20, 1999

[54] CANNED MOTOR BEARING WEAR MONITORING DEVICE

[75] Inventor: Masaaki Eguchi, Saitama, Japan

[73] Assignee: Nikkiso Co., Ltd., Japan

[21] Appl. No.: 08/923,023

[22] Filed: Sep. 3, 1997

[30] Foreign Application Priority Data

Sep. 6, 1996 [JP] Japan ..................................... 8-236483

[51] Int. Cl.$^6$ ....................................................... G05F 1/00
[52] U.S. Cl. ................................... 318/647; 324/158 MG; 324/207.15
[58] Field of Search .................... 324/207.15, 207.12, 324/158 MD, 207.25; 310/90.5; 340/682, 679; 308/1 A; 73/7; 417/12, 44

[56] References Cited

U.S. PATENT DOCUMENTS

| 4,334,189 | 6/1982 | Sato | 324/158 MG |
| 4,924,180 | 5/1990 | Nasr et al. | 324/207.15 |

FOREIGN PATENT DOCUMENTS

| 49-119708 | 10/1974 | Japan . |
| 58-54580 | 12/1983 | Japan . |
| 59-31290 | 8/1984 | Japan . |
| 60-52654 | 11/1985 | Japan . |
| 1308143 | 12/1989 | Japan . |
| 530716 | 2/1993 | Japan . |
| 732566 | 4/1995 | Japan . |

Primary Examiner—William M. Shoop, Jr.
Assistant Examiner—Rita Leykin
Attorney, Agent, or Firm—Morrison Law Firm

[57] ABSTRACT

A wear monitoring device for a motor employs pairs of coils on each end of a motor stator. The coils face the rotor and are sensitive to the gap between the rotor and the stator. Each pair of coils is interconnected in series to generate a differential output. Each pair of coils is positioned opposite the other of the pair so that when, as a result of bearing wear, the gap increases between one coil of a pair and the rotor and decreases between the other coil of the pair, a signal is generated on the output. Since the coils are positioned at a separation of 180 degrees and interconnected to produce a differential output, the fundamental-harmonic voltage is canceled out in the differential signal. The differential signal corresponding to pairs of coils located on opposite axial ends of the stator are applied in parallel through respective diodes to a voltage indicator. Thus the voltage indicator is responsive to bearing wear causing the rotor axis to tilt with respect to the stator axis. In another embodiment, the differential outputs are interconnected in series to a voltage indicator. In this embodiment, the voltage indicator responds to axial displacement of the rotor. In another embodiment, the differential outputs of two pairs of coils are applied through respective diodes to an indicator in series while the differential outputs of another two pairs of coils are applied in parallel so that rotor-tilting and axial displacement caused by bearing wear are indicated.

15 Claims, 6 Drawing Sheets

CANNED MOTOR BEARING WEAR MONITORING DEVICE

BACKGROUND OF THE INVENTION

The present invention relates to devices that monitor the wear of the bearings of a canned motor and more specifically to such devices that monitor such wear based on displacement of the rotor attending the wear of the motor's bearings.

Canned motors are applied in machinery such as pumps. Such duty requires high reliability. Therefore it is essential to have a device to monitor, from outside, the wear of the bearings that support the rotor.

Figure 10:
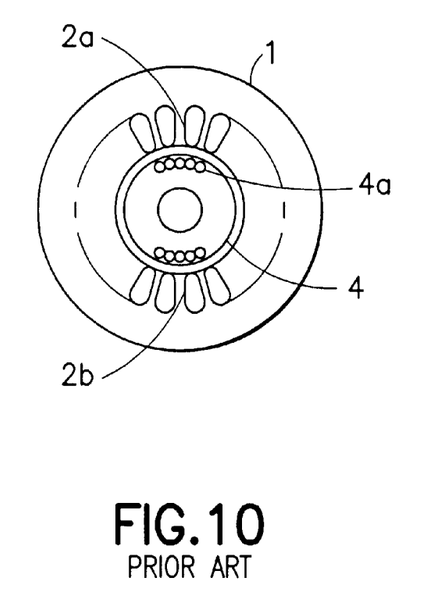
FIG. 10 is an explanatory diagram showing the installation of detection coils on a stator in conventional bearing wear detection.
Figure 11:
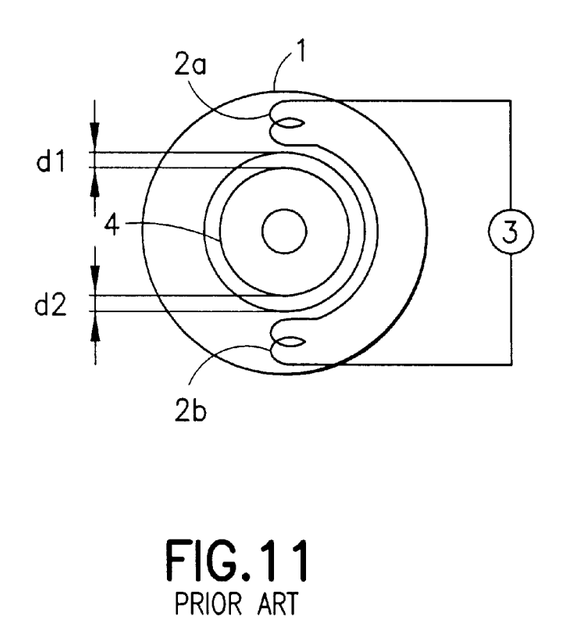
FIG. 11 is an explanatory diagram of the detection circuit.

Referring to FIGS. 10 and 11 a conventional bearing wear monitoring device of the prior art is shown. Detection coils 2a and 2b are attached to iron core teeth of stator 1 at positions 180 degrees opposite each other. The coils run along the entire circumference of the teeth in the longitudinal direction. The coils are connected to produce a differential output which is read and monitored by voltmeter 3.

A voltage is induced in detection coils 2a and 2b by the rotation of rotor 4. The higher-harmonic voltage due to rotor groove 4a is superimposed on the fundamental-harmonic voltage that is synchronized with the frequency of the power source. Since the outputs of detection coils 2a, 2b, are separated by 180 degrees and are interconnected to produce a differential output, the fundamental-harmonic voltage is canceled out at voltmeter 3, and only the difference of the instantaneous values of the higher-harmonic voltage is detected and displayed voltage.

Figure 8:
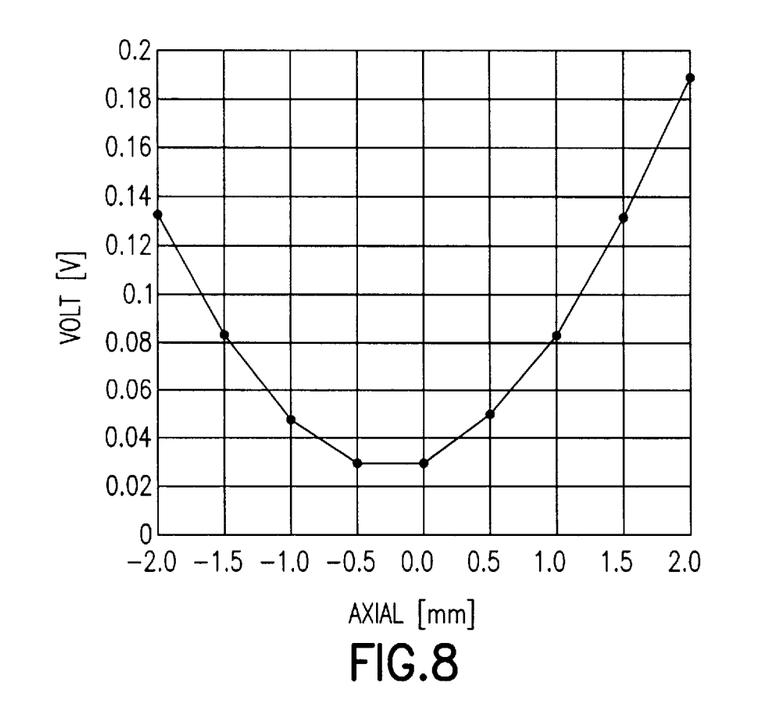
FIG. 8 is a characteristic diagram of the axial displacement of the rotor and the differential output of the detection coils.

Regarding the higher-harmonic voltage, as shown in FIG. 8, when the bearing becomes worn causing gap d1 between stator 1 and rotor 4 to increase and gap d2 to decrease (rotor 4 is displaced in the radial direction), the differential output containing the higher-harmonic voltage variations of detection coil 2b increases and is displayed on voltmeter 3.

A disadvantage with the above-described conventional bearing wear monitoring device is that it is possible to monitor only the state of wear of the bearing in the radial direction. This is detected by detecting only radial movement of rotor 4 moving in the radial direction. Bearing wear in the axial and oblique directions cannot be detected or monitored.

In a canned-motor pump, the direction of the load on the rotor shaft varies with the nature and pressure of the substance flowing through the pump, so from the fact that the direction of wear of the bearing changes, there is a need to detect omni-directional bearing wear.

OBJECTS AND SUMMARY OF THE INVENTION

The invention addresses the drawbacks of the prior art. A purpose of the invention is to provide a bearing wear monitoring device for canned motors that makes it possible to monitor the wear of the bearing causing movement of the rotor in the radial, axial and oblique directions, the latter resulting from wear in the radial direction on one side of the bearing.

Briefly, a wear-monitoring device for a motor employs pairs of coils on each end of a motor stator. The coils face the rotor and are sensitive to the gap between the rotor and the stator. Each pair of coils is interconnected in series to generate a differential output. Each pair of coils is positioned opposite the other of the pair so that when, as a result of bearing wear, the gap increases between one coil of a pair and the rotor and consequently decreases between the other coil of the pair, a signal is generated on the differential output. Since the outputs of coils are positioned at a separation of 180 degrees and interconnected to produce a differential output, the fundamental-harmonic voltage is canceled out in the differential signal. The differential signal corresponding to pairs of coils located on opposite axial ends of the stator are applied in parallel through respective diodes to a voltage indicator. Thus the voltage indicator is responsive to bearing wear causing the rotor axis to tilt with respect to the stator axis. In another embodiment, the differential outputs are interconnected in series to a voltage indicator. In this embodiment, the voltage indicator responds to axial displacement of the rotor. In another embodiment, the differential outputs of two pairs of coils are applied through respective diodes to an indicator in series while the differential outputs of another two pairs of coils are applied in parallel so that tilting and axial displacement caused by bearing wear are indicated.

According to an embodiment of the invention, there are provided two detection coils facing each other with a separation of 180 degrees. These are installed on both longitudinal ends of a stator iron core tooth. The facing ones at each end are differentially connected and these interconnected pairs connected in parallel via diodes. A detection circuit with an output indicator is connected in series to the parallel circuit.

According to another embodiment of the invention, there are provided two detection coils facing each other with a separation of 180 degrees. These are installed on both longitudinal ends of a stator iron core tooth. The facing ones at each end are differentially connected and these interconnected pairs connected in series. A detection circuit with an output indicator is connected in series to the series circuit.

According to still another embodiment of the invention, there are provided two detection coils facing each other with a separation of 180 degrees. These are installed on both longitudinal ends of a stator iron core tooth. A detection circuit with an output indicator is connected to a parallel circuit in which differential output connection circuits of the detection coils are connected in parallel view diodes and to a series-connected circuit in which differential output connection circuits of the detection coils are connected in series via diodes.

According to still another embodiment of the invention, there is provided a notch groove in one part of both longitudinal ends of the stator iron core tooth, and detection coils inserted and held in place, with their terminals disposed outwardly, between this notch groove and the end face of the iron core tooth.

According to still another embodiment of the invention, the induced differential voltage created by the displacement of the rotor radially or obliquely from its normal rotation position crossing the magnetic flux of the stator iron core teeth of the detection coils is monitored by an output indicator, or the larger voltage of the induced differential voltages due to the diodes is monitored by an output indicator, and it detects wear of the bearing in the radial direction or wear of a one-side bearing in the radial direction.

According to still another embodiment of the present invention, the axial displacement of the rotor and the sum voltage of the induced differential voltages of the detection coils are monitored by an output indicator, and it detects axial wear of the bearing.

According to still another embodiment of the present invention, radial or oblique displacement of the rotor, and axial displacement are detected by an output indicator, and it detects the mode of wear of the bearing in the radial direction, one-side radial direction, and axial direction.

According to still another embodiment of the present invention, there is provided, a bearing wear monitoring device for a rotating machine, comprising: first and second elements, having first and second axes, respectively, the first and second elements being rotatingly interconnected by a bearing for rotation about a common axis when the bearing is wear-free, the common axis being a collinear coincidence of the first and second axes, at least two first detection coils, each with a respective pair of output terminals, located on the first element toward one axial end of thereof and at least two second detection coils, each with a respective pair of output terminals, located on the first element toward an opposite axial end of thereof, each of the at least two first detection coils and the at least two second detection coils being positioned adjacent the second element, the at least two first detection coils and the at least two second detection coils being located such that a signal generated by the output terminals of the each respond to a width of a gap between the first element and the second element and the at least two first detection coils and the at least two second detection coils being interconnected to generate a final output such that one or both of an axial displacement and of the first element with respect to the second element and a oblique displacement, where the first and second axes are non-collinear, is/are indicated by final output.

According to still another embodiment of the present invention, there is provided, a bearing wear detector for a motor, comprising: a stator and a rotor interconnected for rotation about a first axis, in a first axial position, by a bearing, the first axis being fixed relative to the stator, the rotor rotating in a second axial position about the first axis or about a second axis crossing the first axis and fixed with respect to the stator, in response to wear of the bearing, one of the stator and the rotor having an armature and the other of the stator and the rotor having a plurality of poles facing the armature, the armature having first and second longitudinal ends, a first pair of coils attached to the armature at the first end, each of the first pair facing the other of the first pair and the poles, a second pair of coils attached to the armature at the second end, each of the second pair facing the other of the second pair and the poles, the first pair of coils being interconnected to generate a first difference signal and the second pair of coils being interconnected to generate a second difference signal, the first and second difference signals being interconnected such that a final signal indicating the wear of the bearing resulting from a change in relative positions of the poles and the first and second pairs of coils resulting from the wear of the bearing.

According to still another embodiment of the present invention, there is provided, a bearing wear detector for a motor, comprising: a stator and a rotor interconnected for rotation about a first axis, in a first axial position, by a bearing, the first axis being fixed relative to the stator, the rotor rotating in a second axial position about the first axis or about a second axis crossing the first axis and fixed with respect to the stator, in response to wear of the bearing, one of the stator and the rotor having an armature and the other of the stator and the rotor having a plurality of poles facing the armature, the armature having first and second longitudinal ends, a first pair of coils attached to the armature at the first end, each of the first pair facing the other of the first pair and the poles, a second pair of coils attached to the armature at the second end, each of the second pair facing the other of the second pair and the poles, the first pair of coils being interconnected to generate a first difference signal and the second pair of coils being interconnected to generate a second difference signal, the first and second difference signals being interconnected to generate a final signal indicating the wear of the bearing resulting from a change in relative positions of the poles relative to the first and second pairs of coils resulting from the wear of the bearing.

According to still another embodiment of the present invention, there is provided, a canned motor bearing wear-monitoring device, comprising: first and second pairs of detection coils located on a stator of a motor, the first pair being 180 degrees opposed to each other on one axial end of the stator and pair being 180 degrees opposed to each other on one axial end of the stator and the second pair being 180 degrees opposed to each other on the other axial end of the stator, terminals of the first and second pairs of coils being interconnected to generate first and second differential outputs which are connected in parallel through respective diodes to a detection circuit with a final output indicator.

According to still another embodiment of the present invention, there is provided, a canned motor bearing wear-monitoring device, comprising: first and second pairs of detection coils located on a stator of a motor, the first pair being 180 degrees opposed to each other on one axial end of the stator and pair being 180 degrees opposed to each other on one axial end of the stator and the second pair being 180 degrees opposed to each other on the other axial end of the stator, terminals of the first and second pairs of coils being interconnected to generate first and second differential outputs which are connected in parallel through respective diodes to a detection circuit with a final output indicator.

According to still another embodiment of the present invention, there is provided, a canned motor bearing wear-monitoring device, comprising: first and second pairs of detection coils located on a stator of a motor, the first pair being 180 degrees opposed to each other on one axial end of the stator and the second pair being 180 degrees opposed to each other on the other axial end of the stator, terminals of the first and second pairs of coils being interconnected to generate first and second differential outputs which are connected in series through a pair of terminals to a detection circuit with a final output indicator.

According to still another embodiment of the present invention, there is provided, a canned motor bearing wear-monitoring device, comprising: first and second pairs of detection coils located on a stator of a motor, the first pair being 180 degrees opposed to each other on one axial end of the stator and the second pair being 180 degrees opposed to each other on the other axial end of the stator, terminals of the first and second pairs of coils being interconnected to generate first and second differential outputs which are connected in parallel through respective first diodes to a detection circuit with a final output indicator, third and fourth pairs of detection coils located on the stator, the third pair being 180 degrees opposed to each other on the one axial end of the stator and the fourth pair being 180 degrees opposed to each other on the other axial end of the stator, termin als of the third and fourth pairs of coils being interconnected to generate third and fourth differential outputs which are connected in series through a second pair of terminals to the detection circuit.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
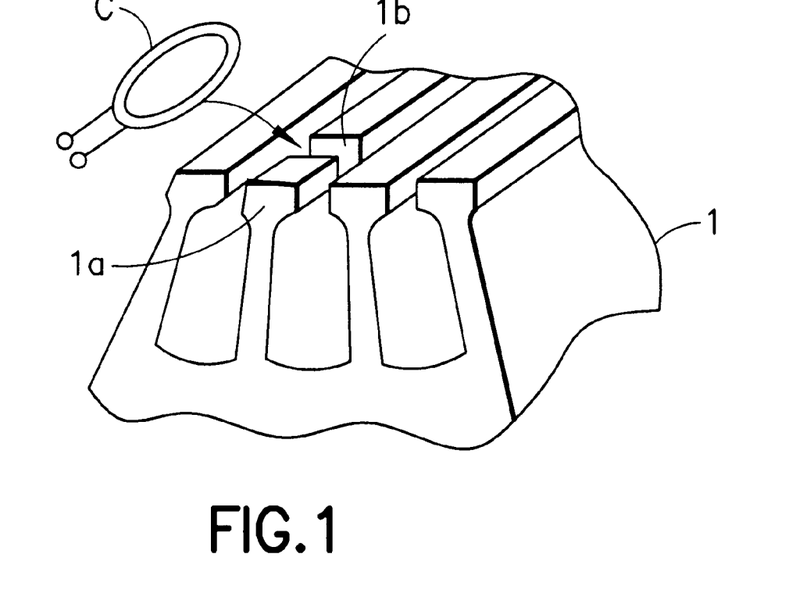
FIG. 1 is a perspective view showing how a detection coil is installed on an iron core tooth of the stator.

Referring to FIG. 1, detection coils are installed on both ends of the iron core teeth 1a of a stator lying opposite the rotor with a gap between them. There is a notch groove 1b in part of both longitudinal ends (only one end is shown in the diagram) of iron core tooth 1b of stator 1. Between this notch groove 1a and the end face of the iron core tooth, detection coil C is inserted and affixed (by resin, for example) to iron core tooth 1a, with its terminal projecting outwardly.

Figure 2:
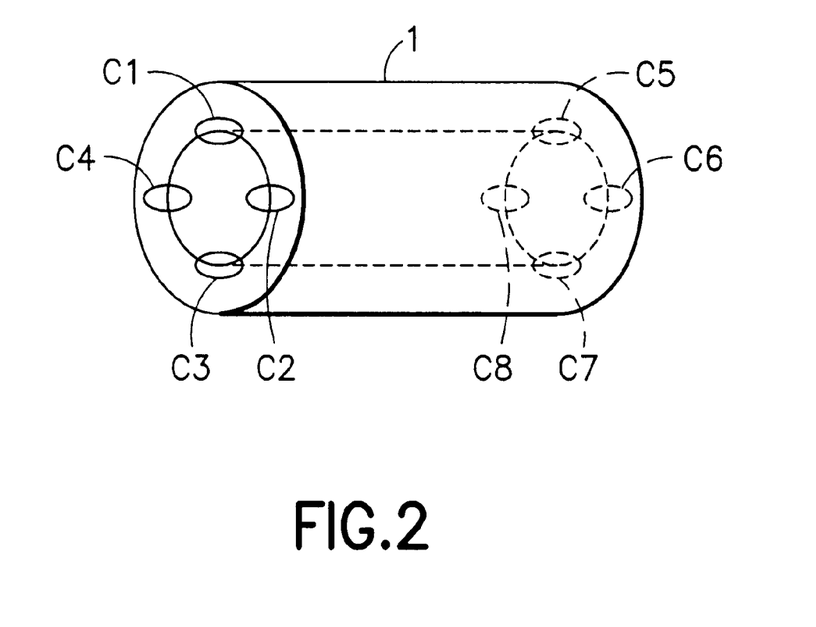
FIG. 2 is a diagram showing detection coils installed on both longitudinal ends of the stator, in accordance with the mode of detection.

Referring to FIG. 2, detection coils as described above, are positioned to detect radial or oblique displacement of the rotor. To do this, detection coils C1, C3 and detection coils C5, C7 are positioned opposite each other at positions separated by 180 degrees. One pair of detection coils, C1, and C3 are positioned at one longitudinal end of iron core on opposing teeth 1a of stator 1. These detect axial displacement of the rotor in one direction. Detection coils C2, C4 and detection coils C6, C8 are provided opposite each other separated by 180 degrees each on both longitudinal ends of iron core teeth 1a. These detect radial displacement or oblique displacement and axial displacement of the rotor. Thus, detection coils C1–C8 are provided.

Figure 3:
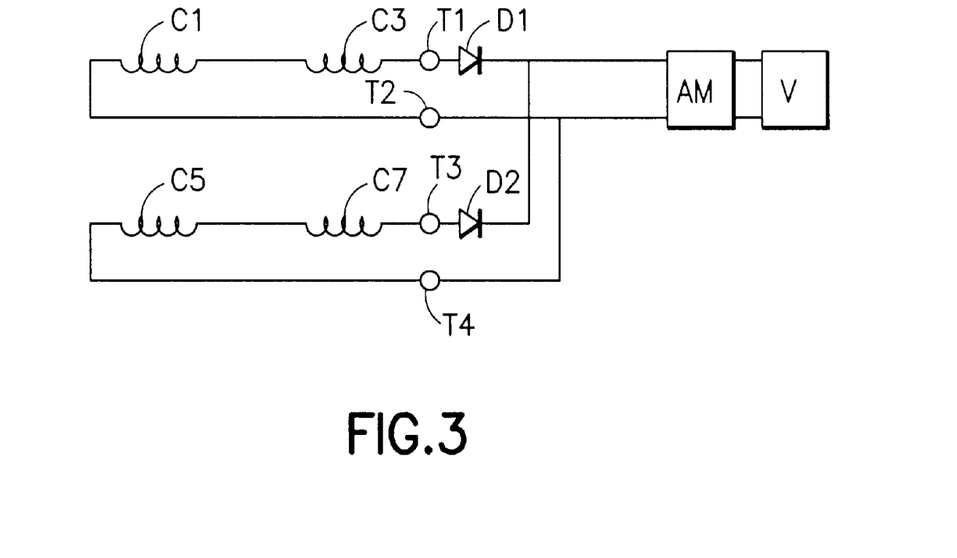
FIG. 3 is a diagram showing a detection circuit that detects radial and oblique displacement of the rotor.

Referring to FIG. 3, if radial displacement of the rotor is to be detected, then as shown in FIG. 3, on the induction motor side, detection coil C1 and detection coil C3 are located on both longitudinal ends of iron core tooth 1a of stator 1. Detection coils C1 and C3 are interconnected to generate a differential output at output terminals T1, T2. Detection coils C5 and C7 are interconnected to generate a differential output at output terminals T3, T4. The differential outputs of detection coil pairs C1, C3 and C5, C7 are connected in parallel through diodes D1, D2 and the resultant output applied to an output indicator V (for example, a voltmeter).

Thus the differential output circuits of the aforesaid detection coils C1 and C3 and the detection coils C5 and C7 cancel out the fundamental harmonic as described above with respect to the prior art. The parallel output cancels out the lower harmonics of the signals leaving only the higher-harmonic voltages which are applied to output indicator V via an amplifier AM. The amount of displacement of the rotor in the radial direction that is associated with wear of the bearing in the radial direction is thereby detected and indicated.

Diodes D1, D2 on the detection side insure that output indicator V displays the greater of the two differential outputs, detection coils C1 and C3 and detection coils C5 and C7. This makes it possible to detect oblique displacement of the rotor arising from radial wear of the bearing on one side.

Figure 4:
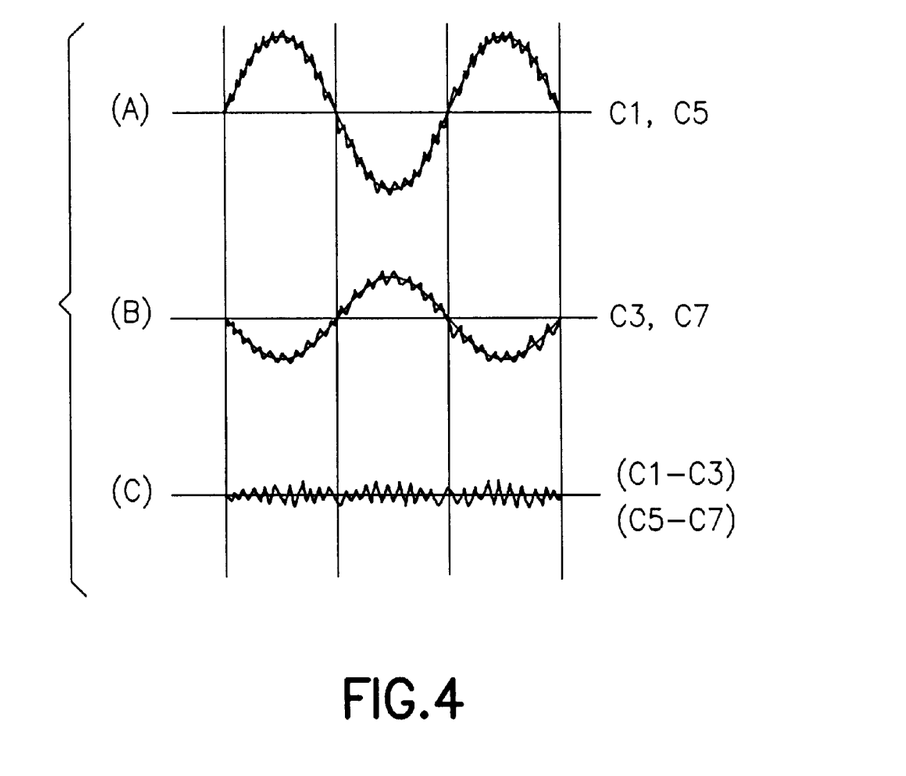
FIG. 4 is a graph of the voltage wave-forms of the detection coils when the rotor is displaced in the radial direction.

Referring to FIG. 4, the wave-forms of the induced voltage of detection coils C1, C5 and C3, C7, when the rotor is displaced toward detection coils C1, C5, are shown. Curve (A) shows the voltage wave-form of detection coils C1, C5. Curve (B) shows the voltage wave-form of detection coils C3, C7. Curve (C) shows the composite (differential) output wave-form of detection coils C1, C3 and detection coils C5, C7. The fundamental harmonic (the frequency of the power source) is canceled out. The ripple portion, and the wear of the bearing in the radial direction are detected.

In output wave-form (C), if there is a difference in the differential output wave-form of detection coils C1 and C5 and the differential output of detection coils C3 and C7, the greater output is output via diode D1 or D2. This output indicates the wear on the bearing in the radial direction on one side.

Figure 5:
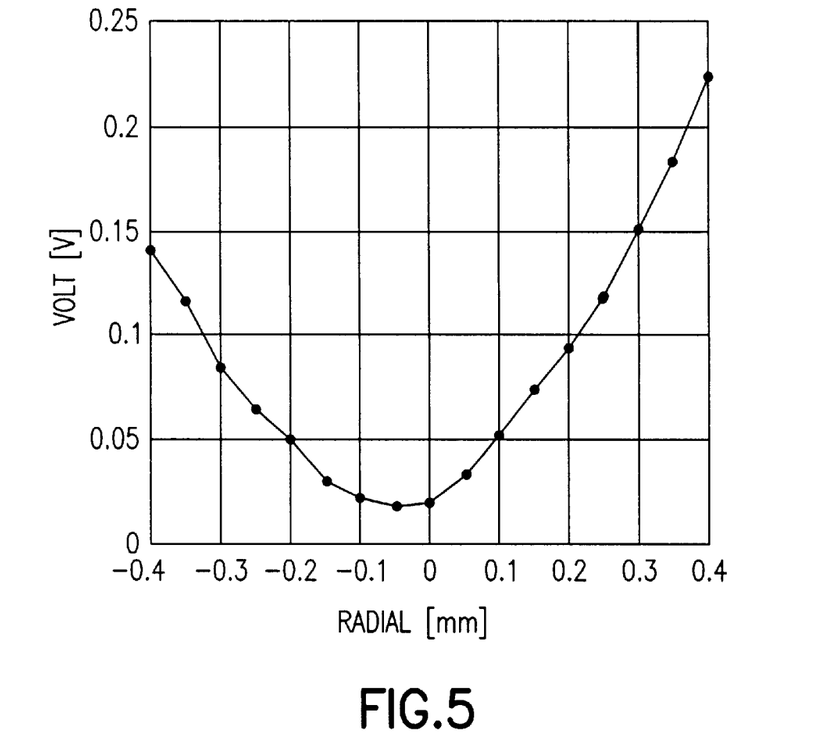
FIG. 5 is a characteristic diagram of the radial displacement of the rotor and the differential output of the detection coils.

Referring to FIG. 5 a characteristic diagram of the radial displacement of the rotor and the differential output of the detection coils is shown.

Figure 6:
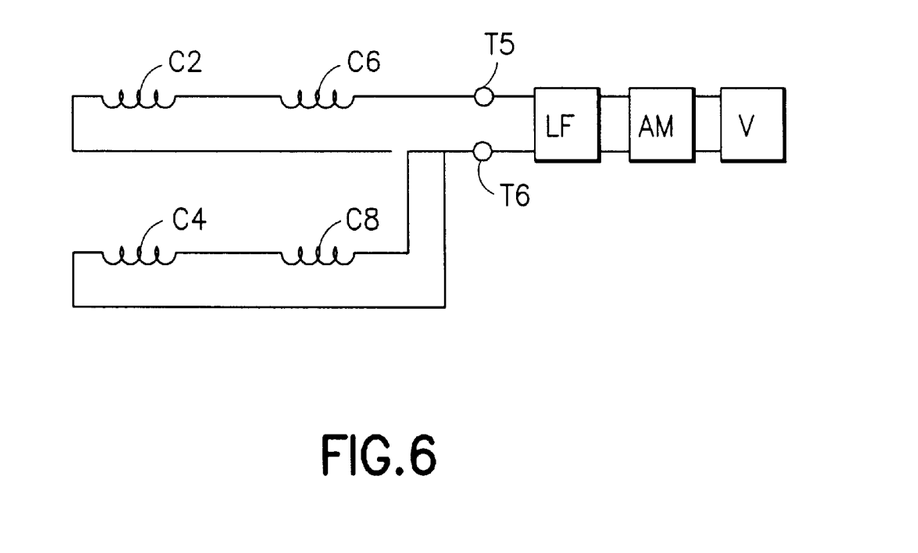
FIG. 6 is a diagram showing a detection circuit that detects axial displacement of the rotor.

If axial displacement of the rotor is to be detected, output terminals T5, T6 are connected to detection coils C2 and C6 as shown in FIG. 6. The coils are positioned on the two longitudinal ends of iron core teeth 1a of stator 1 as described above. By their connection, their outputs are differenced, and applied to a circuit that detects coils C4 and C8 so that their output is a differential output. On the detection side, output indicator V is connected to output terminals T5, T6 through low-pass filter LF and amplifier AM.

If the rotor is displaced axially due to axial-direction wear load of the bearing, then the sum of the differential outputs of detection coils C2 and C6 and detection coils C4 and C8 passes through low-pass filter LF and amplifier AM and is displayed on output indicator V. When this happens, the higher harmonics (ripple) are removed by a low-pass filter LF, improving the sensitivity.

Figure 7:
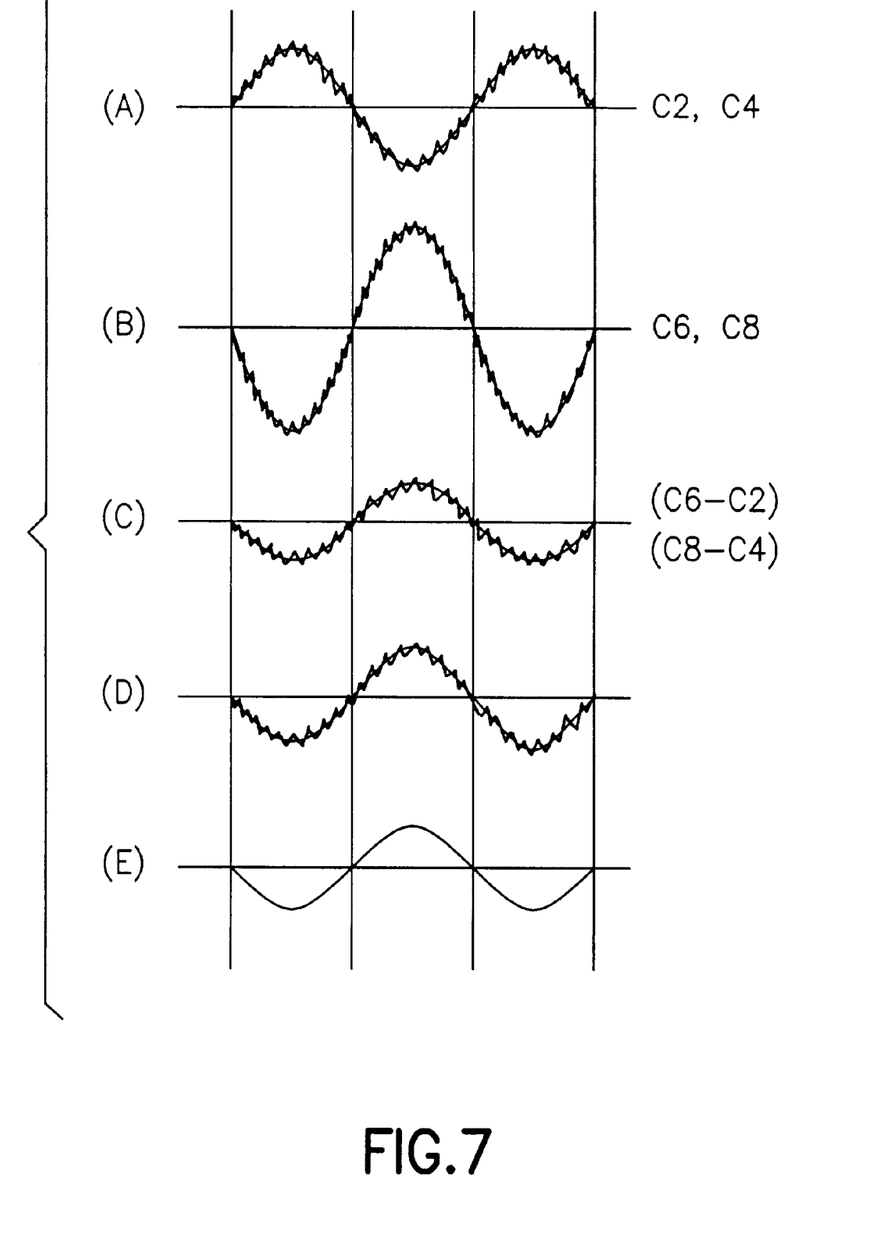
FIG. 7 is a graph of the voltage wave-forms of the detection coils when the rotor is displaced in the axial direction.

FIG. 7 shows the wave-form of the induced voltage of each detection coil when the rotor is displaced in the axial direction (displaced toward detection coils C6, C8). Curve (A) shows the voltage wave-form of detection coils C2, C4. Curve (B) shows the voltage wave-form of detection coils C6, C8. Curve (C) shows the differential output wave-forms of detection coils C2 and C6 and of detection coils C4 and C8. Curve (D) shows the composite (sum) wave-form of the differential output. Curve (E) shows the wave-form resulting after the ripple is removed by low-pass filter LF, and the wear of the bearing in the axial direction is detected by the output of the composite wave-form of (D) or (E).

In a case in which there are load fluctuations or voltage fluctuations, the fundamental harmonic (frequency of the power source) of the above wave-form will increase or decrease. The effect of this can be minimized by the differencing of the outputs of the detection coils. The same can be said of the aforesaid displacement in the radial direction, that is, the outputs are differenced and applied to the indicator.

FIG. 8 is a characteristic diagram of the axial displacement of the rotor and the differential output of the detection coils.

Figure 9:
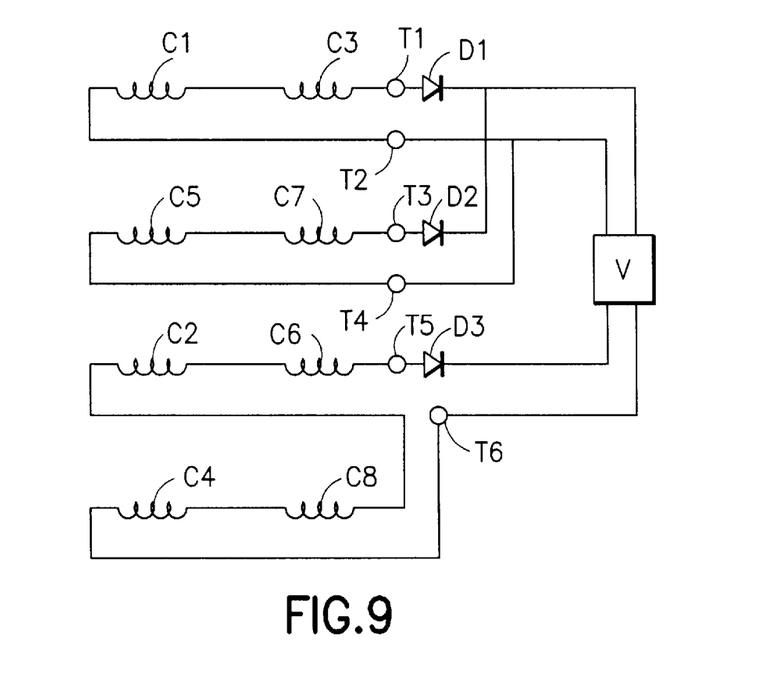
FIG. 9 is a diagram showing a detection circuit that detects radial, oblique, and axial displacement of the rotor.

Referring to FIG. 9, if the radial displacement, oblique displacement, and axial displacement of the rotor are to be detected, then, as shown in FIG. 9, two sets of detection coils C1, C3: C2, C4 and C5, C7:C6, C8 are installed facing each other and separated by 180 degrees as described above on both longitudinal ends of iron core teeth 1a of stator 1. Output indicator V is connected to the detection coil differential output parallel circuit as shown in FIG. 9. This circuit detects radial displacement as in the embodiment of FIG. 3, and axial displacement as the series as the series circuit shown in FIG. 6. In this case, a diode D3 is inserted between the voltage indicator and the series circuit.

As described above, detection of various modes of displacement, with little interference, is made possible according to the invention. This is accomplished, in part, because radial displacement of the rotor and detection of axial displacement are detected by separate coils.

To hold in place detection coils C, inserted in the stator iron core tooth 1a between notch groove 1b formed in one part and the tooth's end face, materials other than resin, such as electrically insulating adhesive, may be used.

The aforesaid amplifier AM is not always necessary, nor is low-pass filter LF a mandatory part, but they may be interposed in order to improve the detection sensitivity.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

What is claimed is:

1. A bearing wear monitoring device for a rotating machine having first and second elements rotating interconnected, along a common axis, by a bearing, said device comprising:

said first and said second elements, having first and second axes, respectively;

said first and second elements rotate about said common axis when said bearing is wear-free;

said common axis being a collinear coincidence of said first and second axes;

at least two first detection coils, each with a respective pair of output terminals, located on said first element toward one axial end of thereof and at least two second detection coils, each with a respective pair of output terminals, located on said first element toward an opposite axial end of thereof, each of said at least two first detection coils and said at least two second detection coils being positioned adjacent said second element;

said at least two first detection coils and said at least two second detection coils being located such that a signal generated by said output terminals of said each respond to a width of a gap between said first element and said second element; and said at least two first detection coils and said at least two second detection coils being interconnected to generate a final output such that one or both of an axial displacement and of said first element with respect to said second element and a oblique displacement, where said first and second axes are non-collinear. is/are indicated by final output.

2. A device as in claim 1, wherein said first element is one of a stator and a rotor of a canned motor and said second element is the other of a stator and a rotor of said canned motor.

3. A device as in claim 1, wherein:

said output terminals of said at least two first detection coils are serially interconnected to generate a first difference signal;

said output terminals of said at least two second detection coils are serially interconnected to generate a second difference signal;

all of said output terminals are interconnected to form said final output.

4. A bearing wear detector for a motor, said motor having a stator interconnected to a rotor, along a first axis, by a bearing, said detector comprising:

said stator and said rotor rotate about said first axis when in a first axial position;

said first axis be fixed relative to said stator;

said rotor rotating in a second axial position about said first axis or about a second axis crossing said first axis and fixed with respect to said stator, in response to wear of said bearing;

one of said stator and said rotor having an armature and the other of said stator and said rotor having a plurality of poles facing said armature;

said armature having first and second longitudinal ends;

a first pair of coils attached to said armature at said a first end, each of said first pair facing the other of said first pair and said poles;

a second pair of coils attached to said armature at said second end, each of said second pair facing the other of said second pair and said poles;

said first pair of coils being interconnected to generate a first difference signal and said second pair of coils being interconnected to generate a second difference signal;

said first and second difference signals being interconnected such that a final signal indicating said wear of said bearing resulting from a change in relative positions of said poles and said first and second pairs of coils resulting from said wear of said bearing.

5. A detector as in claim 4, wherein said rotor rotates in said second axial position about said first axis in response to said wear of said bearing.

6. A detector as in claim 4, wherein said rotor rotates about a second axis crossing said first axis and fixed with respect to said stator, in response to said wear of said bearing.

7. A detector as in claim 4, wherein each of said first and second pairs of coils is affixed in a notch in a pole piece of said armature.

8. A bearing wear detector for a motor having a stator interconnected, along a first axis, to a rotor, by a bearing, comprising:

said stator and said rotor rotate about said first axis when in a first axial position;

said first axis being fixed relative to said stator;

said rotor rotating in a second axial position about said first axis or about a second axis crossing said first axis and fixed with respect to said stator, in response to wear of said bearing;

one of said stator and said rotor having an armature and the other of said stator and said rotor having a plurality of poles facing said armature;

said armature having first and second longitudinal ends;

a first pair of coils attached to said armature at said first end, each of said first pair facing the other of said first pair and said poles;

a second pair of coils attached to said armature at said second end, each of said second pair facing the other of said second pair and said poles;

said first pair of coils being interconnected to generate a first difference signal and said second pair of coils being interconnected to generate a second difference signal;

said first and second difference signals being interconnected to generate a final signal indicating said wear of said bearing resulting from a change in relative positions of said poles relative to said first and second pairs of coils resulting from said wear of said bearing.

9. A detector as in claim 8, wherein each of said first and second difference signals are applied to first terminals of a diode, a second end of which is applied to a common input of a voltage indicator.

10. A bearing wear-monitoring device for a canned motor having a stator, said device comprising:

first and second pairs of detection coils located on said stator;

said first pair being 180 degrees opposed to each other on one axial end of said stator and said second pair being 180 degrees opposed to each other on the other axial end of said stator;

terminals of said first and second pairs of coils being interconnected to generate first and second differential outputs which are connected in parallel through respective diodes to a detection circuit with a final output indicator.

11. A bearing wear-monitoring device for a canned motor having a stator, said device comprising:

first and second pairs of detection coils located on said stator;

said first pair being 180 degrees opposed to each other on one axial end of said stator and said second pair being 180 degrees opposed to each other on the other axial end of said stator;

terminals of said first and second pairs of coils being interconnected to generate first and second differential outputs which are connected in parallel through respective diodes to a detection circuit with a final output indicator.

12. A bearing wear-monitoring device for a canned motor having a stator, said device comprising:

first and second pairs of detection coils located on said stator;

said first pair being 180 degrees opposed to each other on one axial end of said stator and said second pair being 180 degrees opposed to each other on the other axial end of said stator;

terminals of said first and second pairs of coils being interconnected to generate first and second differential outputs which are connected in series through a pair of terminals to a detection circuit with a final output indicator.

13. A device as in claim 12, further comprising a low pass filter between said pair of terminals and said detection circuit.

14. A device as in claim 12, further comprising an amplifier connected in series with said low pass filter.

15. A bearing wear-monitoring device for a canned motor having a stator, comprising:

first and second pairs of detection coils located on said stator;

said first pair being 180 degrees opposed to each other on one axial end of said stator and said second pair being 180 degrees opposed to each other on the other axial end of said stator;

terminals of said first and second pairs of coils being interconnected to generate first and second differential outputs which are connected in parallel through respective first diodes to a detection circuit with a final output indicator;

third and fourth pairs of detection coils located on said stator;

said third pair being 180 degrees opposed to each other on said one axial end of said stator and said fourth pair being 180 degrees opposed to each other on said other axial end of said stator;

terminals of said third and fourth pairs of coils being interconnected to generate third and fourth differential outputs which are connected in series through a second pair of terminals to said detection circuit.

* * * * *